United States Patent
Ihde

(10) Patent No.: US 9,636,959 B1
(45) Date of Patent: May 2, 2017

(54) TRAILER WIRING CONNECTOR WITH FINGER PULL HOLE AND METHOD OF MAKING SAME

(71) Applicant: HOPKINS MANUFACTURING CORPORATION, Emporia, KS (US)

(72) Inventor: David Harvey Ihde, Admire, KS (US)

(73) Assignee: Hopkins Manufacturing Corporation, Emporia, KS (US)

( * ) Notice: Subject to any disclaimer, the term of this patent is extended or adjusted under 35 U.S.C. 154(b) by 0 days.

(21) Appl. No.: 15/093,946

(22) Filed: Apr. 8, 2016

Related U.S. Application Data

(60) Provisional application No. 62/288,031, filed on Jan. 28, 2016.

(51) Int. Cl.
| | |
|---|---|
| *B60D 1/62* | (2006.01) |
| *H01R 24/22* | (2011.01) |
| *H01R 13/504* | (2006.01) |
| *H01R 13/717* | (2006.01) |
| *H01R 43/20* | (2006.01) |
| *H01R 43/18* | (2006.01) |
| *H01R 13/633* | (2006.01) |
| *H01R 105/00* | (2006.01) |

(52) U.S. Cl.
CPC .............. *B60D 1/62* (2013.01); *H01R 13/504* (2013.01); *H01R 13/633* (2013.01); *H01R 13/7175* (2013.01); *H01R 24/22* (2013.01); *H01R 43/18* (2013.01); *H01R 43/20* (2013.01); *H01R 2105/00* (2013.01)

(58) Field of Classification Search
CPC  H01R 43/24; H01R 2201/26; H01R 13/6335; B60D 1/64
See application file for complete search history.

(56) References Cited

U.S. PATENT DOCUMENTS

| | | | | |
|---|---|---|---|---|
| 1,685,608 A | * | 9/1928 | Lipschutz | H01R 24/28 439/483 |
| 3,093,434 A | * | 6/1963 | Francis | H01R 24/28 264/255 |

* cited by examiner

*Primary Examiner* — Ross Gushi
(74) *Attorney, Agent, or Firm* — Hovey Williams LLP

(57) ABSTRACT

A wiring connector for connecting the lighting system wiring of a first vehicle to the lighting system wiring of a second vehicle so that lights on the first vehicle are activated when corresponding lights on the second vehicle are activated. The connector includes a plurality of terminals configured for coupling with corresponding terminals on a mating connector on the second vehicle; a plurality of wires each having one end electrically coupled with one of the terminals and another end for electrically connecting to the wiring of the first vehicle lighting system; a wire-retaining ring; and a housing formed around the terminals, the wires, and the wire-retaining ring, the housing including a central opening within the wire-retaining ring.

19 Claims, 2 Drawing Sheets

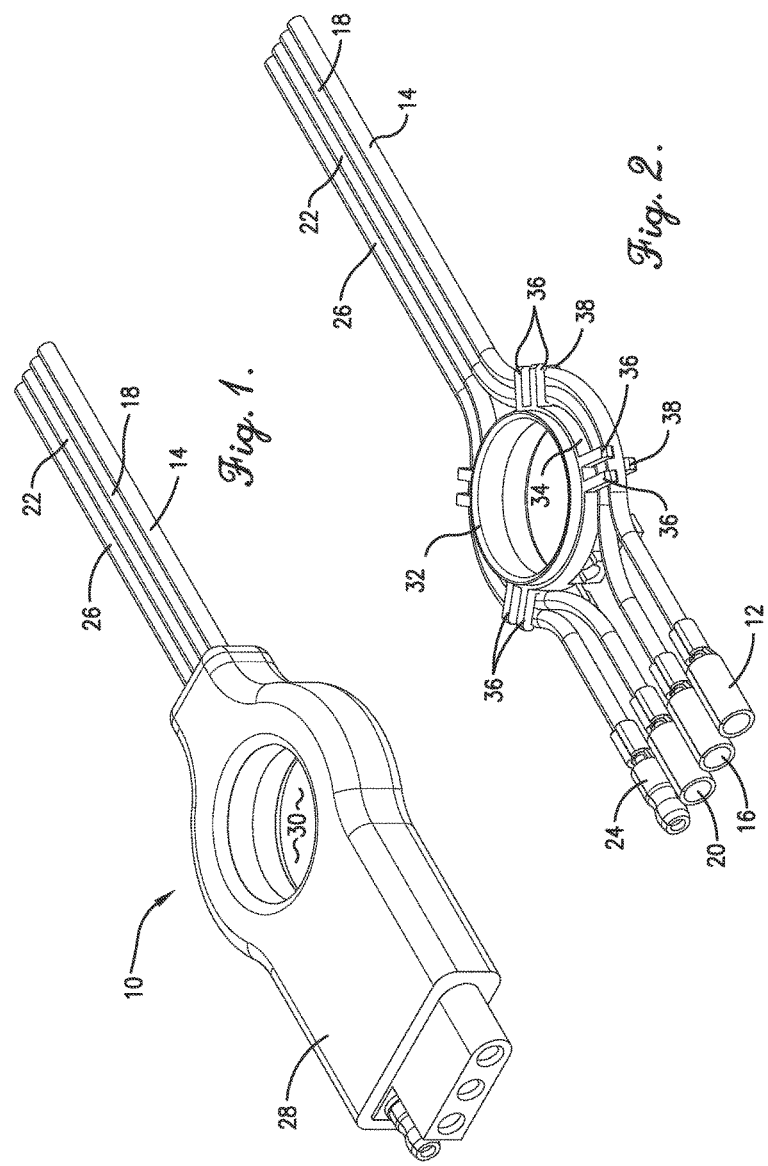

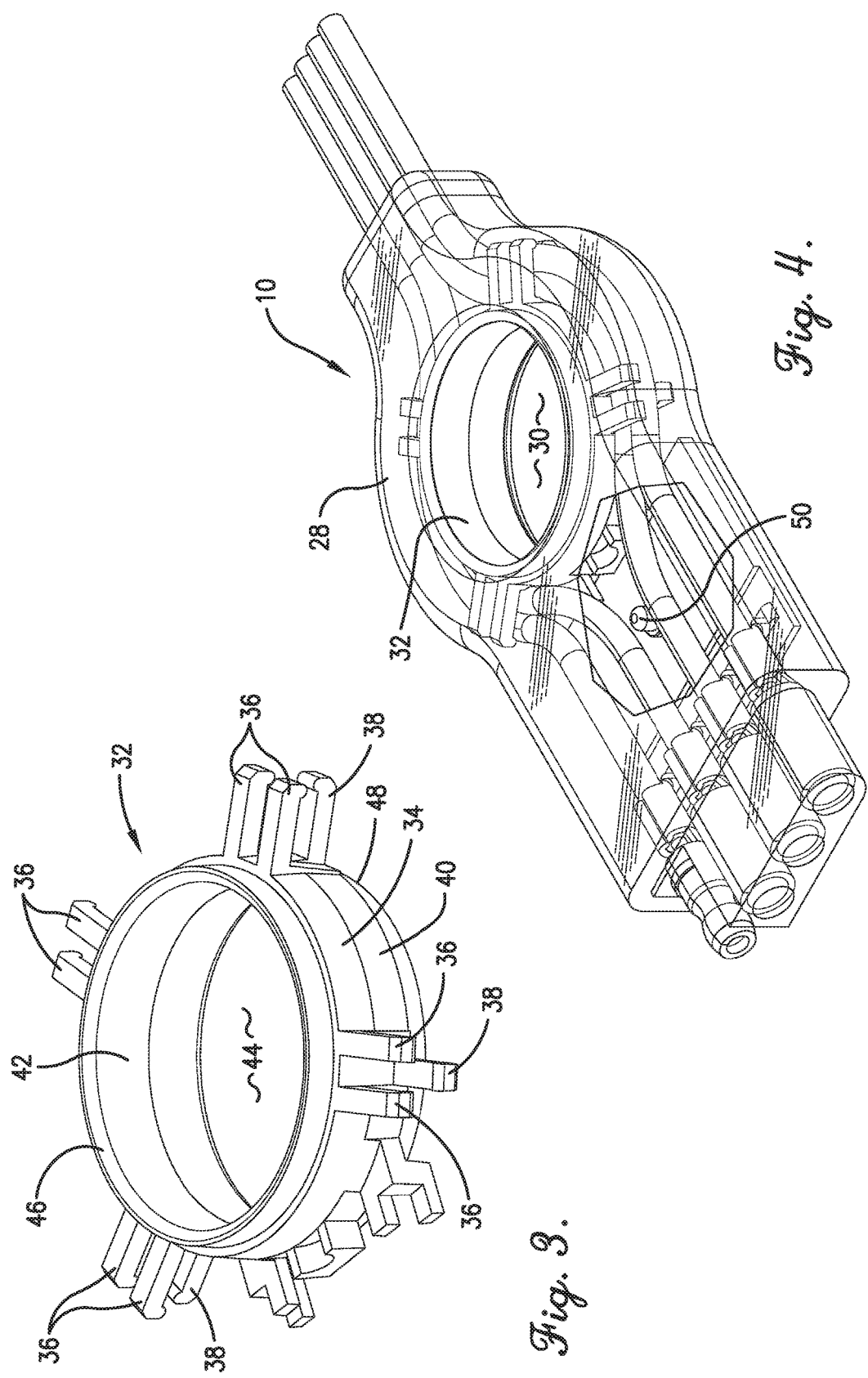

TRAILER WIRING CONNECTOR WITH FINGER PULL HOLE AND METHOD OF MAKING SAME

RELATED APPLICATION

This patent application claims priority benefit with regard to all common subject matter of U.S. Provisional Patent Application No. 62/288,031, filed Jan. 28, 2016, and entitled "TRAILER WIRING CONNECTOR AND FINGER PULL HOLE AND METHOD OF MAKING SAME," which is hereby incorporated by reference in its entirety into the present application.

BACKGROUND

Trailer wiring connectors are often used to interconnect the lighting system wiring of a towing vehicle such as a truck to the lighting system wiring of a towed vehicle such as a boat trailer so that the turn signals, tail lights, and/or other lights on the towed vehicle are activated at the same time as the corresponding lights on the towing vehicle. Such connectors typically include one connector coupled to the wiring on the towed vehicle and a mating connector coupled to the wiring on the towing vehicle. These mating connectors are difficult to pull apart, especially when they get wet and/or coated with grease, oil, or other lubricants used on vehicles. Because of this, users often "wiggle" and flex the connectors while pulling them apart, which often damages the terminals of the connectors.

SUMMARY

The present invention solves the above-described problems by providing an improved wiring connector that is easier to disconnect from a mating connector. The invention also provides an improved method of making such a connector. The wiring connector may be configured for connecting to the wiring of either a towed vehicle or a towing vehicle.

A wiring connector constructed in accordance with an embodiment of the invention broadly includes a plurality of terminals configured for coupling with corresponding terminals on a mating connector and a plurality of wires each having one end electrically coupled with one of the terminals and another end for electrically connecting to the wiring of a vehicle lighting system. The wiring connector also includes a housing formed around the terminals and the wires. The housing includes a central opening that serves as a finger pull hole that allows a user to more easily grip the connector and pull it straight away from a mating connector without wiggling or flexing the connectors relative to one another.

In accordance with an important aspect of the invention, the wiring connector also includes a wire-retaining ring for holding the wires of the connector around the central opening in the housing during fabrication of the connector. An embodiment of the wire-retaining ring includes a raceway having an outer wall and an inner wall that defines a central opening; and a plurality of prongs extending from the outer wall of the raceway for holding portions of the wires adjacent the outer wall of the raceway so that the wires are routed around the central opening in the ring to permit formation of an unobstructed central opening in the housing.

In accordance with another aspect of the invention, the housing may be formed of a semi-transparent or translucent material such that the wire-retaining ring, terminals, and wires within the housing are visible from the exterior of the connector. An LED or other light may be placed inside the housing and electrically connected to one or more of the terminals to illuminate the connector from within whenever it is plugged into a mating connector. This provides an immediate indication that the connector 10 has been properly connected to its mating connector and serves as a beacon that aids a user in locating the connector.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein:

FIG. 1 is a perspective view of a wiring connector constructed in accordance with an embodiment of the invention.

FIG. 2 is a perspective view of the internal components of the wiring connector of FIG. 1 with its housing removed so as to show the internal components of the connector.

FIG. 3 is a perspective view of the wire-retaining ring inside the wiring connector of FIG. 1.

FIG. 4 is a perspective view of a wiring connector constructed in accordance with another embodiment of the invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of embodiments of the invention references the accompanying drawings. The embodiments are intended to describe aspects of the invention in sufficient detail to enable those skilled in the art to practice the invention. Other embodiments can be utilized and changes can be made without departing from the scope of the claims. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Turning now to the drawing figures and initially FIG. 1, a wiring connector 10 constructed in accordance with an embodiment of the invention is illustrated. An embodiment of the wiring connector 10 is configured to be connected to the lighting system wiring on a trailer, boat, camper, or any other towed vehicle and mates with a corresponding connector on a truck, car, or other towing vehicle so as to interconnect the towed vehicle lighting system with the towing vehicle lighting system. Other embodiments of the connector may be designed for connecting to the lighting system on a towing vehicle and configured for coupling with a mating connector on a towed vehicle. The illustrated connector is a 4-way flat connector that is configured for coupling with a mating 4-way flat connector on a towing vehicle. However, the connector 10 may instead be a 5-way flat connector, a 7-blade connector, a 6-way round type connector, or any other style of connecter, as the particular shape and configuration of the connector is not important to the present invention.

The wiring connector 10 broadly comprises a plurality of terminals configured for coupling with corresponding terminals on a mating connector and a plurality of wires each having one end electrically coupled with one of the terminals and another end for electrically connecting to the wiring of the towed vehicle lighting system. The wiring connector also includes a housing formed around the terminals and the wires. The housing includes a central opening that serves as a finger pull hole that allows a user to more easily grip the connector and pull it straight away from the mating connector on the towed vehicle without wiggling or flexing the connectors relative to one another. The wiring connector also includes a wire-retaining ring for holding the wires in place while the wiring connector is fabricated. The wire-retaining ring includes a raceway that defines a central opening and a plurality of prongs extending from the raceway for holding portions of the wires so that the wires are routed around the central openings of the ring and the housing.

More specific embodiments of the wiring connector 10 will now be described with reference to FIGS. 2 and 3. An embodiment of the connector 10 has a terminal 12 connected to a wire 14 to be connected to the towed vehicle's right turn light assembly, a terminal 16 connected to a wire 18 to be connected to the towed vehicle's left turn light assembly, a terminal 20 connected to a wire 22 to be connected to the towed vehicle's tail light assembly (which may be the towed vehicle's left and right turn light assemblies), and a terminal 24 connected to a wire 26 to be connected to a ground connector. The order, placement, and number of terminals may be varied without departing from the scope of the invention.

The wiring connector 10 may also include LEDs or other indicators for the terminals 12, 16, 20 to indicate wiring continuity between the terminals and the corresponding terminals on a mating connector on a towed vehicle. For example, an LED for a terminal may turn on, blink, or change color if a signal is present on the terminal, thus indicating the corresponding signal of the towed vehicle has been activated and the corresponding right turn signal on the towed vehicle should also be activated.

In the embodiment of the wiring connector 10 shown in FIG. 1, the terminals 12, 16, 20, 24, wires 14, 18, 22, 26, and other circuitry of the connector are molded into a housing 28 having a central circular opening 30. The opening 30 may be any shape and size, and in one embodiment is circular and approximately ¾-2 inches in diameter. The opening 30 allows a user to more securely grip the connector 10 and connect it to or remove it from a mating connector without twisting it or moving it side-to-side and placing stress on the wires 14, 18, 22, 26 and terminals 12, 16, 20, 24. Specifically, a user may insert one or more fingers into the opening 30 when attaching or detaching the connector to or from a mating connector and pull the wiring connection 10 straight away from its mating connector without wiggling the connectors relative to one another.

When manufacturing the wiring connector 10, the wires 14, 18, 22, 26 connected to the terminals 12, 16, 20, 24 must be routed around the central circular opening 30 during the molding operation to prevent the wires from becoming exposed outside the molded housing 28. To accomplish this, a wire-retaining ring 32 may be used to hold the wires in place during fabrication of the connector. The ring 32 may be circular, teardrop shape, rectangular, or any shape that matches the shape and size of the central opening 30.

The embodiment of the ring 32 shown in FIGS. 2 and 3 includes a central ring-shaped raceway 34 and prongs 36, 38 that extend from the raceway to retain the wires in a desired position during the molding operation. As best shown in FIG. 2, the prongs are staggered along the circumference of the raceway 34, with some of the prongs 36 extending from the top of the raceway and some of the prongs 38 extending from the bottom of the raceway so that the wires can be inserted between opposing prongs.

A specific embodiment of the wire-retaining ring 32 will now be described in more detail with reference to FIG. 3. The raceway 34 of the ring 32 has an outer wall 40, an inner wall 42 that defines a central opening 44, and spaced apart top and bottom edges 46, 48 which connect the outer wall 40 and inner wall 42. The top and bottom edges 46, 48 may taper inwardly toward their outermost edges to provide a corresponding tapering in the central opening 30 of the housing 28. A number of the prongs 36 may extend from the top edge 46 of the raceway and a number of the prongs 38 may extend from the bottom edge 48 of the raceway to form sets of opposed prongs. The prongs are formed of plastic or other semi-flexible materials so that their ends may be pushed apart slightly to permit the wires to be positioned between opposed prongs and routed around the central opening. The distal ends of the prongs 36 may have integral snap-action hooks for securely holding the wires between the prongs. Once the wires are secured in the ring 32, the housing is molded around the ring, terminals, and the wires.

In an embodiment of the invention illustrated in FIG. 4, the housing 28 is molded from translucent or semi-transparent materials such that the wire-retaining ring 32; terminals 12, 16, 20, and 24; and the wires 14, 18, 22, 26 within the housing are visible from the exterior of the housing. An LED 50 or other light may be placed inside the molded housing 28 and electrically connected to one or more of the terminals to illuminate the connector from within whenever it is plugged into a mating connector. This provides an immediate indication that the connector 10 has been properly connected to its mating connector and serves as a beacon that aids a user in locating the connector.

The above-described embodiments of the wiring connector 10 and other embodiments may be manufactured by electrically connecting the wires to the terminals; securing the wires to the wire-retaining ring; and then molding the housing around the terminals, the wires, and the raceway such that the housing has a central opening within the central opening of the raceway.

Although the invention has been described with reference to the preferred embodiment illustrated in the attached drawing figures, it is noted that equivalents may be employed and substitutions made herein without departing from the scope of the invention as recited in the claims. For example, the specific shape, size, and terminal configuration of the wiring connector may be changed without departing from the principles of the invention. Also, the principles of the present invention apply to both wiring connectors for towed vehicles and wiring connectors for towing vehicles.

Having thus described the preferred embodiment of the invention, what is claimed as new and desired to be protected by Letters Patent includes the following:

1. A connector for connecting wiring of a first vehicle lighting system to wiring of a second vehicle lighting system so that lights on the first vehicle are activated when corresponding lights on the second vehicle are activated, the connector comprising:
  a plurality of terminals configured for coupling with corresponding terminals on a mating connector on the second vehicle;
  a plurality of wires each having one end electrically coupled with one of the terminals and another end for electrically connecting to the wiring of the first vehicle lighting system;
  a wire-retaining ring including:
    a raceway having an outer wall and an inner wall that defines a central opening; and
    a plurality of prongs extending from the outer wall of the raceway for holding portions of the wires adjacent the outer wall of the raceway so that the wires are routed around the central opening;
  a housing formed around the terminals, the wires, and the wire-retaining ring, the housing including a central opening within the central opening of the raceway.

2. The connector as set forth in claim 1, the raceway having spaced apart top and bottom edges which connect the inner wall and outer wall, wherein some of the prongs extend from the top edge of the raceway and some of the prongs extend from the bottom edge of the raceway so that the wires are held between the prongs extending from the top edge of the raceway and the prongs extending from the bottom edge of the raceway.

3. The connector as set forth in claim 2, wherein the prongs that extend from the top edge of the raceway have downwardly extending hooks and wherein the prongs that extend from the bottom edge of the raceway have upwardly extending hooks.

4. The connector as set forth in claim 1, wherein the housing is molded around the terminals, the wires, and the wire-retaining ring.

5. The connector as set forth in claim 1, wherein the housing is molded from translucent materials so that the terminals, the wires, and the wire-retaining ring within the housing are at least partially visible from outside the connector.

6. The connector as set forth in claim 5, further comprising a light positioned inside the housing and electrically connected to one of the terminals such that the light is illuminated when the connector is connected to the mating connector on the towing vehicle.

7. The connector as set forth in claim 5, wherein the first vehicle is a towed vehicle and the second vehicle is a towing vehicle.

8. A four-way flat connector for connecting wiring of a first vehicle lighting system to wiring of a second vehicle lighting system so that lights on the first vehicle are activated when corresponding lights on the second vehicle are activated, the connector comprising:
  three terminals configured for coupling with corresponding terminals on a mating connector on the second vehicle;
  a ground terminal configured for coupling with corresponding ground terminal on the mating connector of the second vehicle;
  a plurality of wires each having one end electrically coupled with one of the terminals or the ground terminal and another end for electrically connecting to the wiring of the first vehicle lighting system or a ground connection;
  a wire-retaining ring including:
    a raceway having an outer wall and an inner wall that defines a central opening; and
    a plurality of prongs extending from the outer wall of the raceway for holding portions of the wires adjacent the outer wall of the raceway so that the wires are routed around the central opening;
  a housing formed around the terminals, wires, and wire-retaining ring, the housing including a central opening within the central opening of the raceway.

9. The connector as set forth in claim 8, the raceway having spaced apart top and bottom edges which connect the inner wall and outer wall, wherein some of the prongs extend from the top edge of the raceway and some of the prongs extend from the bottom edge of the raceway so that the wires are held between the prongs extending from the top edge of the raceway and the prongs extending from the bottom edge of the raceway.

10. The connector as set forth in claim 9, wherein the prongs that extend from the top edge of the raceway have downwardly extending hooks and wherein the prongs that extend from the bottom edge of the raceway have upwardly extending hooks.

11. The connector as set forth in claim 8, wherein the housing is molded around the terminals, the wires, and the wire-retaining ring.

12. The connector as set forth in claim 8, wherein the housing is molded from translucent materials so that the terminals, the wires, and the wire-retaining ring within the housing are at least partially visible from outside the connector.

13. The connector as set forth in claim 12, further comprising an LED positioned inside the housing and electrically connected to one of the terminals such that the LED is illuminated when the connector is connected to the mating connector on the towing vehicle.

14. A four-way flat connector for connecting wiring of a towed vehicle lighting system to wiring of a towing vehicle lighting system so that lights on the towed vehicle are activated when corresponding lights on the towing vehicle are activated, the connector comprising:
  three terminals configured for coupling with corresponding terminals on a mating connector on the towing vehicle;
  a ground terminal configured for coupling with corresponding ground terminal on the mating connector of the towing vehicle
  a plurality of wires each having one end electrically coupled with one of the terminals or the ground terminal and another end for electrically connecting to the wiring of the towed vehicle lighting system or a ground connection;

a wire-retaining ring including:
  a raceway having an outer wall, an inner wall that defines a central opening, and spaced apart top and bottom edges which connect the inner wall and outer wall; and
  a plurality of prongs extending from the top edge of the raceway and a plurality of prongs extending from the bottom edge of the raceway for holding portions of the wires between the prongs so that the wires are routed around the central opening;
a housing formed around the terminals, wires, and wire-retaining ring, the housing including a central opening within the central opening of the raceway.

15. The connector as set forth in claim 14, wherein the prongs that extend from the top edge of the raceway have downwardly extending hooks and wherein the prongs that extend from the bottom edge of the raceway have upwardly extending hooks.

16. The connector as set forth in claim 14, wherein the housing is molded around the terminals, the wires, and the wire-retaining ring.

17. The connector as set forth in claim 16, wherein the housing is molded from translucent materials so that the terminals, the wires, and the wire-retaining ring within the housing are at least partially visible from outside the connector.

18. The connector as set forth in claim 17, further comprising an LED positioned inside the housing and electrically connected to one of the terminals such that the LED is illuminated when the connector is connected to the mating connector on the towing vehicle.

19. A method of making a wiring connector that is capable of being used for connecting wiring of a towed vehicle lighting system to wiring of a towing vehicle lighting system, the method comprising:
  electrically connecting a plurality of wires to a plurality of terminals;
  positioning the wires around a wire-retaining ring that includes a raceway with a central opening;
  molding a housing around the terminals, the wires, and the raceway such that the housing has a central opening within the central opening of the raceway; and
  electrically connecting a light to one of the wires and molding the housing around the light such that the light illuminates the housing from within when the light is lit.

* * * * *